Figure 1:
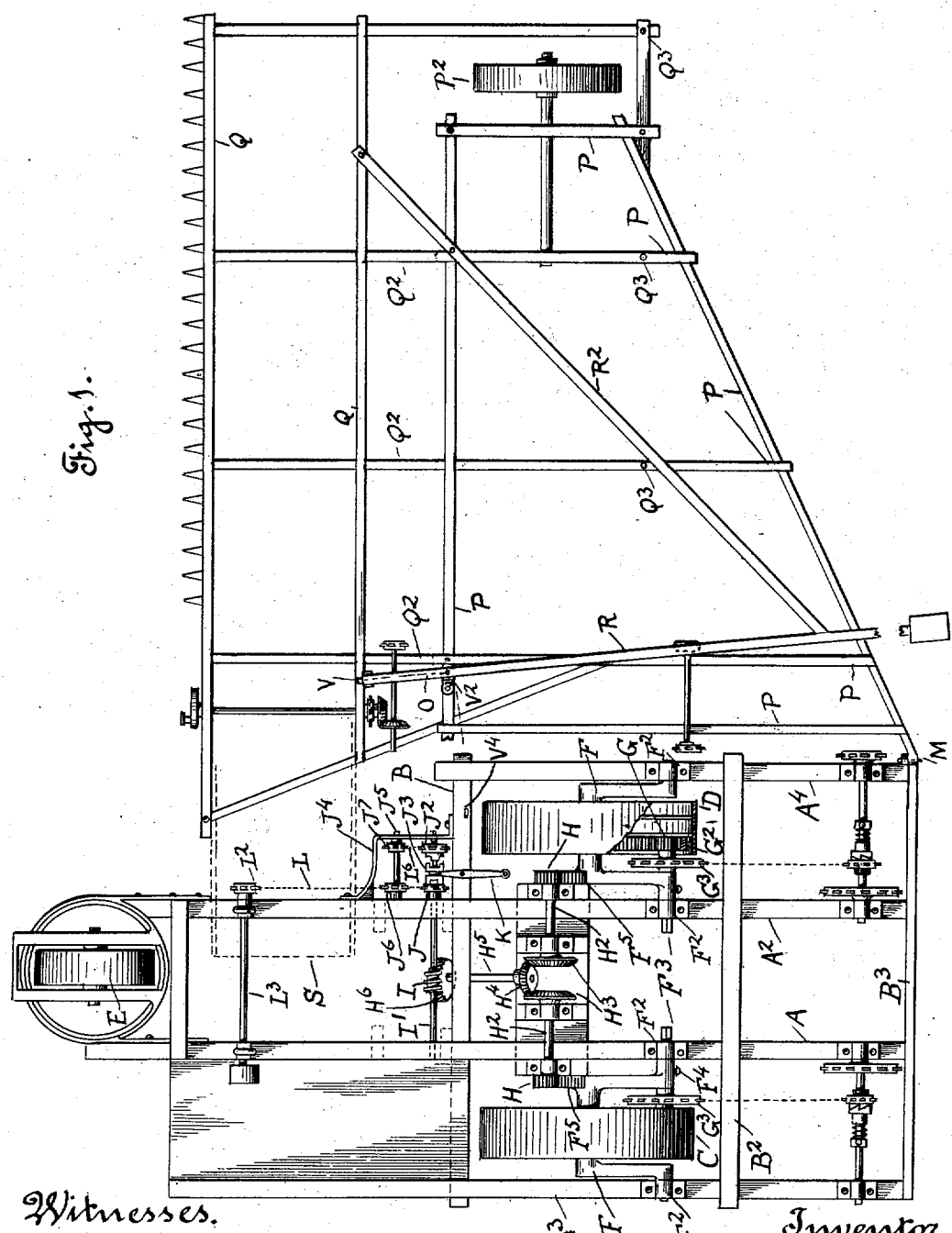

No. 886,703. PATENTED MAY 5, 1908.
G. W. INGERSOLL.
HARVESTER.
APPLICATION FILED JAN. 22, 1904.

4 SHEETS—SHEET 2.

Witnesses.
Inventor
G. W. Ingersoll
by A. H. Ste Marie
atty.

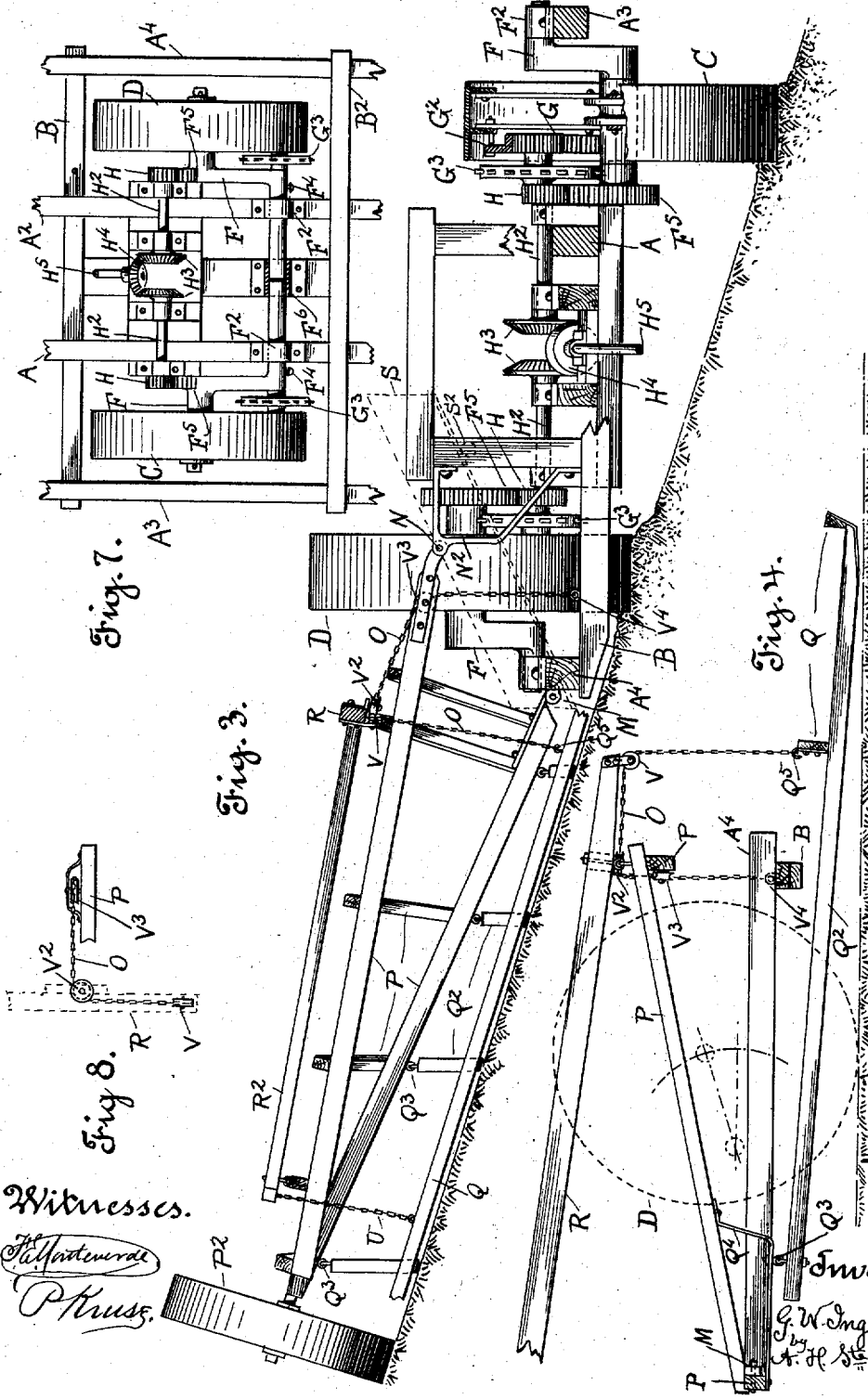

No. 886,703. PATENTED MAY 5, 1908.
G. W. INGERSOLL.
HARVESTER.
APPLICATION FILED JAN. 22, 1904.

4 SHEETS—SHEET 4.

Witnesses.
F. Monteverde.
P. Kruse.

Inventor.
G. W. Ingersoll
by A. H. Ste. Marie
atty

UNITED STATES PATENT OFFICE.

GEORGE W. INGERSOLL, OF STOCKTON, CALIFORNIA.

HARVESTER.

No. 886,703.  Specification of Letters Patent.  Patented May 5, 1908.

Application filed January 22, 1904. Serial No. 190,215.

*To all whom it may concern:*

Be it known that I, GEORGE W. INGERSOLL, a citizen of the United States of America, and a resident of Stockton, in the county of San Joaquin and State of California, have invented certain new and useful Improvements in Harvesters, of which the following is a specification.

This invention aims to produce a more serviceable "two-wheeled side-hill harvester" than any of those heretofore invented. These machines, it is understood, consist of a combined header and thresher, and are particularly designed to harvest grain upon a "side-hill". The thresher part is carried upon two main driving-wheels that sustain most of the weight and drive the machinery, a third wheel in front being used merely to balance the machine and steer it. This thresher part has to be kept practically level so as to allow the cylinders, fans, etc. to work properly, and in order to keep it level the two main wheels are so mounted that one of them may be lowered and the other raised at the same time, according to the incline of the ground. The header part is hinged to the thresher at its inner end, and its outer end is supported by a small wheel called the "grain wheel". It follows the slope of the ground at all times and thereby keeps the cutter-bar parallel with the ground over which it is passing.

Heretofore the apparatus for raising and lowering the driving-wheels has seldom, if ever, been made staunch enough to stand the continual wrenching and straining to which it must necessarily be subjected. Unsatisfactory work and frequent accidents have been the result. Most of the machines now in use have each of their driving-wheels set in a separate frame, the rear portion of which is hinged to the timbers of the thresher and the front end supported by chains attached to brackets on said front end and wound around drums on the thresher frame. The drums for the respective wheels wind and unwind in opposite directions, and, when adjusting the position of the wheels, the chain attached to one corner of one of the wheel-frames frequently overlaps itself as it coils on its drum or gets twisted and hence becomes shorter than the chain attached to the other corner of the same wheel-frame, so that a breakdown often follows. Other machines have been designed in which each of the two main driving-wheels is supported by a normally fixed axle and a pair of pinions meshing in vertically disposed racks secured to the thresher frame, the apparatus being operated by means of sprocket chains and wheels. In this construction the racks are necessarily long and somewhat weak, thus allowing for too much wabbling motion. The parts therefore soon work loose and will not hold the wheels firmly in the position required.

The main object to be attained is to be able to adjust the driving-wheels at an exact point and then hold them fixedly there by some simple device that will not permit any of the parts to work loose. To accomplish this result, I have invented a device for raising either one of the driving-wheels as desired, and at the same time lowering the other, which does away with all wheel-frames and weak attachments and simply comprises a cogged segment of a circle that is attached to the axle and meshes with a fixed pinion. The axle is crank-shaped and the pinion is revolved by power furnished from the said driving-wheels. My invention is constructed with especial attention to making it staunch and perfectly adjustable.

Figure 2:
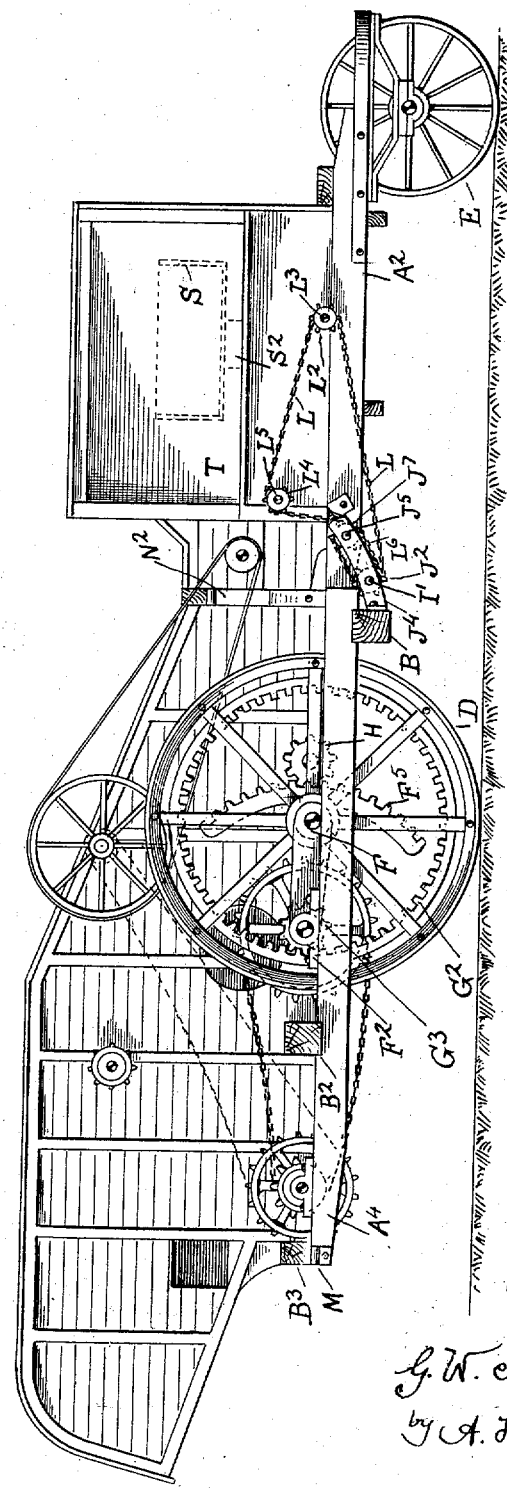
Figure 5:
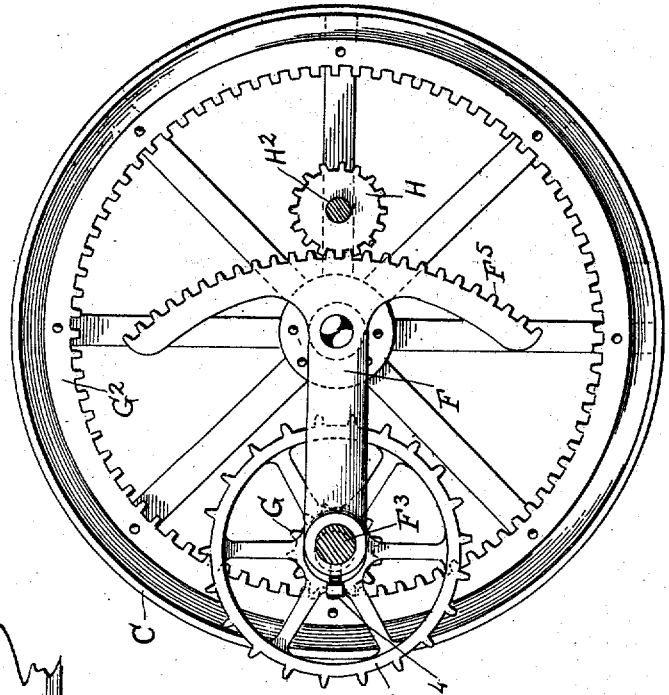
Figure 6:
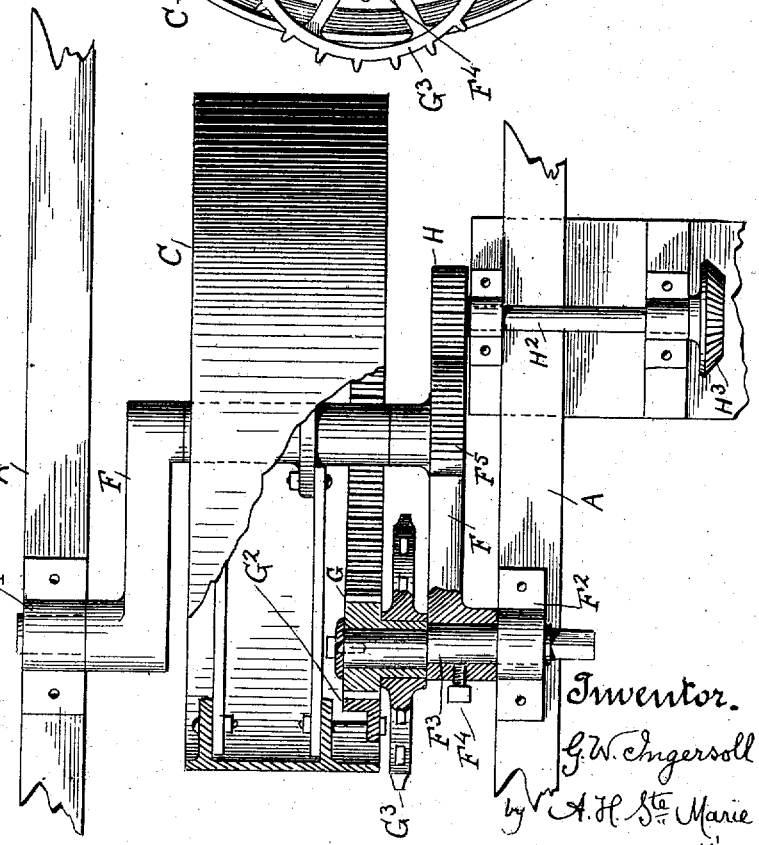

In the accompanying drawings, which are hereby especially referred to, Figure 1 is a plan view of the frame of my complete machine, showing the driving-wheels and the mechanism for raising and lowering them, and also the connecting gears used to operate both the header and thresher. Fig. 2 is a side elevation of the thresher, showing one of the driving-wheels, its cogged segment, the pinion that meshes in said segment, and sprocket wheels and chains by which the power is applied to raise and lower the driving-wheels. Fig. 3 is a sectional elevation taken across both the header and thresher in front of the driving-wheels, the machine being shown upon a hillside, with one wheel up and the other down. The header part here, as always, is parallel with the surface of the ground. Fig. 4 is a side elevation, partly in section, of some of the timbers of the header frame and of the thresher frame. It shows a chain by which the height of the inner end of the sickle or cutter bar is automatically adjusted. Fig. 5 is an enlarged side elevation of one of the drive-wheels, including its crank shaped axle, cogged segment, and pinion that meshes in said segment. Fig. 6 is a plan view of practically the same parts as are shown in elevation in Fig. 5. Fig. 7 is a plan view of both driving-wheels, showing a modified form of the crank-shaped axles, and the gears that turn the pinions which mesh in the cogged segments. The axles here shown consist of but one crank to each wheel, while in the other figures a double crank is shown as the axle to each wheel. Fig. 8 is a detail plan view, showing in horizontal aspect the chain above referred to as effecting the adjustment of the sickle or cutter bar.

Throughout this specification and accompanying drawings similar letters and numerals of reference indicate similar parts.

The frame of the thresher part of this harvester is composed of two main longitudinal timbers A and $A^2$, and three main cross timbers B, $B^2$, and $B^3$. There are also two shorter longitudinal timbers $A^3$ and $A^4$, fastened to the said cross timbers, one outside of each driving-wheel. The feeder-house, sack-sewer's platform, separator, cleaner, and other parts of the thresher rest upon this frame in the same way that they do in most combined machines of the same class. These parts are also constructed in the manner generally followed in building harvesters.

The driving-wheels, designated C and D, are respectively placed between the timbers A $A^3$ B $B^2$ and $A^2$ $A^4$ B $B^2$. The steering-wheel, marked E, is placed between the front ends of the timbers A and $A^2$, in a frame of its own. Each of the driving-wheels, C and D, is provided with a separate crank-shaped axle F on which it freely revolves,—preferably a double crank with one arm on each side of the wheel. The ends of these axles or cranks F are brought into alinement with one another near the peripheries of their respective wheels, and the timbers A $A^2$ $A^3$ $A^4$, as well as the other members of the thresher frame and parts thereon, are supported from said axle ends by journal-boxes $F^2$.

The inner end of each axle F is perforated or bored out transversely of the inside crank arm and serves as a bearing for one end of a spindle $F^3$, which spindle is formed of two members $F^6$ and $F^7$ integral with, but offset from or eccentric to each other and this spindle is adjustably secured in its said bearing by means of a set-screw $F^4$. This spindle carries upon its other end a loose pinion G, in position to be engaged by an internal gear $G^2$ on the driving-wheel (C or D) to which the axle belongs. A sprocket-wheel $G^3$ is secured to or rigidly mounted upon the hub of each pinion G, and sprocket-chains leading therefrom are employed to drive the thresher and header operating mechanisms. The journaled end of said spindle $F^3$ is squared to admit of its being turned by a wrench (not shown) in order to throw the pinion G into or out of greater mesh with its driver, thereby providing for the accurate adjustment and compensation for wear of these parts. The set-screw $F^4$, it will be understood, is loosened to make the adjustment and when tightened afterwards holds the parts in their adjusted position. The internal gear $G^2$ is secured to its respective driving-wheel in any suitable manner, as by being bolted to the spokes or rim of the wheel.

When the machine is standing in its normal position, as upon level ground, the crank arms of each axle F are made to lie preferably in a horizontal or level plane, substantially in the same plane with the thresher supporting frame, so that either one of the said arms or pair of arms can be turned equally upward or downward to cause either one of the driving-wheels or both of them to move up or down relatively to the said frame whenever the machine reaches and passes over sloping ground, thereby maintaining the level position of the frame while the wheels follow the sloping surface. I prefer to move both driving-wheels simultaneously, in opposite directions, as shown in Fig. 3, which is done by swinging the crank arms of the two axles oppositely, each on its journaled end or at the point where it supports the frame. A very convenient and effective means of making this change of position is to provide a pinion H, which will engage with the teeth of a vertical rack $F^5$, that is formed on or secured to each of the inner crank arms at the end where it joins its respective axle F. The rack $F^5$ is curved and forms an arc or segment of a circle whose center is at the other end of the crank arm, in each instance, as clearly seen in Figs. 2, 5 and 6. It is kept permanently engaged by the pinion, and under normal conditions extends equidistantly above and below the frame, and thus is capable (being of adequate length) of moving its crank arm and axle, and driving-wheel, the extent required to effect any change of position desired, in either direction. As the two driving-wheels are made movable, two pinions H and two racks $F^5$ are necessarily provided. Each one of these pinions is keyed to the outer end of a separate shaft $H^2$, suitably journaled transversely of the thresher frame. The cross shafts $H^2$ are in alinement and carry on their inner ends, which are adjacent to each other, bevel-gears $H^3$, one on each. A bevel-pinion $H^4$, secured to one end of a longitudinal shaft $H^5$, is mounted between said gears $H^3$ so as to be in mesh with both of them at all times. It is now evident that by rotating the last named shaft and its pinion in either direction the two aforementioned shafts $H^2$ and their pinions H will be rotated in opposite directions and will respectively cause one of the racks $F^5$ to move up and the other one to move down, consequently varying the position of the axles F and driving-wheels C and D relatively to the thresher frame and operating to keep the thresher upright irrespectively of the inclination of the ground over which the machine is passing.

The aforesaid shaft $H^5$ is preferably driven by means of a worm I on a shaft $I'$, which is journaled across the frame in front of the driving-wheels in position to keep the said worm in engagement with a worm-wheel $H^6$ on the forward end of $H^5$. One end of this worm-shaft $I'$ projects beyond its bearing on the right of the frame and is provided with two sprocket-wheels J and $J^2$, which are loosely mounted thereon and each provided with a clutch member. A double clutch $J^3$ is slidably mounted on the worm-shaft between the respective clutch members of said wheels J $J^2$ and is adapted to be thrown into engagement with either of them by ordinary mechanism, represented by the lever K in Fig. 1. The projecting end of the said worm-shaft is supported by a bracket $J^4$, secured to the timbers of the frame. A short shaft $J^5$ is journaled in this bracket at one end and on the timber at the other end a slight distance in front of the worm-shaft. Two sprocket-wheels $J^6$ and $J^7$ are secured to the shaft $J^5$ in alinement with the previously mentioned sprocket-wheels J and $J^2$ respectively. Power is communicated to these sprocket-wheels from the thresher operating mechanism, by means of a sprocket-chain L, which passes over a sprocket-wheel $L^2$ at one end of the forward shaft ($L^3$) of the mechanism for delivering the grain to the cylinder, thence over a sprocket-wheel $L^4$ on the rear shaft ($L^5$) of this mechanism, thence down under the sprocket-wheel $J^6$, over and around the sprocket-wheel J, and thence back to the sprocket-wheel $L^2$. The chain L causes the sprocket-wheels $J^6$, $J^7$, and J to be positively driven from the threshing mechanism, the wheel J revolving in the opposite direction to the other two wheels. The wheel $J^2$ also is driven in the same direction as the wheels $J^6$ and $J^7$, by means of a sprocket-chain $L^6$ connecting it with the wheel last named ($J^7$). From this it will be seen that the wheels J and $J^2$ are constantly revolving in opposite directions and the shaft $I'$ on which they are loosely mounted can be made to rotate in either direction by sliding the double clutch $J^3$ into engagement with the clutch members of the sprocket-wheel which is revolving in the direction in which it is desired to have the shaft rotate. With such an arrangement the mechanism for raising and lowering the wheels C and D can either be left stationary, or be operated easily and positively from the thresher mechanism by simply shifting the double clutch from its point of rest either way and causing it to engage either wheel J or $J^2$.

Instead of providing the axles F of the driving-wheels C and D with double crank arms as above described and illustrated in Figs. 1, 3 and 6, they may each have but one arm as shown in Fig. 7. In the latter case the inner arms preferably are retained, each axle F forming a single crank, which is directly journaled in one of the boxes $F^2$ that are bolted to and hold up the thresher frame. From the boxes $F^2$ the alined ends of the cranks project inwardly in this construction, and are received in an additional bearing $F^6$ common to both and also bolted to a middle timber of the thresher frame intermediate of the said boxes, the spindles that carry the sprocket-wheels $G^3$ entering the crank arms only from the sides thereof that are adjacent to the driving-wheels. Otherwise the construction is the same as before described.

It will be observed that the main apparatus for raising and lowering the driving-wheels (including the axle-cranks and cogged segments, the pinions acting upon the same at opposite ends, the internal gears, and the worm-gearing that normally keeps the apparatus in locked position, but exclusive of the power transmitting devices external thereto which may be varied at will) is practically all located between or within or inside the said driving-wheels, in a place or space that is not needed nor utilized nor desirable for anything else and which at the same time is the most convenient for the intended purpose, that is, forwardly in front of the fanning-mill of the separator where there is no objectionable superstructure. It will also be noticed that the racks or segments never change position relatively to the circumference of their respective driving-wheels, being so confined that they cannot project below the sills of the thresher frame on the upside or uprise when the separator is tipped on sloping ground or kept vertical. If a rack goes down, the adjacent driving-wheel goes down with it, thereby allowing the sills of the frame to reach the ground if need be and thus insuring a greater range of tipping with consequent capability of working on steeper hillsides than is possible with other harvesters. Furthermore it will be noted that the weight of the thresher is distributed or divided between two points within the driving-wheels on opposite sides of the axles, that is to say, between the internal gears and pinions engaged thereby on one side, and the racks or cogged segments and the pinions meshing thereinto on the other side. When the machine is at rest, the weight is somewhat thrown back close to the cross timber that binds the frame and where there is more strength in the frame. As the machine moves forward, the power exerted by the upwardly moving portions of the driving-wheels upon the rear pinions (G) causes them to act upon the axle-cranks as on the long arms of a pair of levers having the axles for their fulcra and carrying the racks on their short arms. This has a tendency to swing down the racks and minimize the strain and wear on them and the pinions in engagement therewith. Very little power is required to move the racks when the machine is in motion, the draft relieving them from strain while offsetting the weight of the separator at the back and operating to throw it more upon the axles where the machine can best stand it. With this arrangement it is not possible for the thresher to tilt up or back. In other words, the parts are so balanced as to counteract the upward thrust and downward heft of the machine, if I may use the expression.

As it is necessary to vary the position of the driving-wheels relatively to the thresher frame to keep the thresher vertical when operating on an incline or hillside, so it is necessary to change the relative adjustment of the header portion of the machine to permit the sickle or cutter bar to be always parallel with the surface or ground over which it is passing (so that the machine can be in any position and still cut the grain evenly at the proper height). To do this, the thresher and header are flexibly connected together, preferably by two pivots or hinges M and N, between their respective frames (Figs. 1 to 4) and the inner end of the sickle or cutter bar is adapted to be raised or lowered by means of an adjusting chain O (Figs. 3, 4, and 8) leading from the frame thereof to the thresher frame, as will presently be described. The said header comprises a supporting frame P, usually called an A-frame, which at its inner end has the aforementioned pivotal connections M and N with the thresher and at its outer end is mounted upon a wheel P$^2$ (the grain wheel); a sickle or cutter frame Q located forwardly of the said A-frame, with the under side of which it is pivotally connected and from the top of which it is supported by a counterbalance consisting of weighted and interconnected levers R R$^2$; and a spout S hinged to the inner end of the said sickle or cutter frame and entering the feeder-house (T) of the threshing apparatus wherein it rests upon a rub-block S$^2$. The spout S is shown in dotted lines in Figs. 1, 2 and 3. These parts are of ordinary construction, except in the following details or particulars.

In my improved harvester, the A-frame is so mounted that when the machine is standing in its normal position, as on level ground, the front sill of the said frame inclines upward from the center of the grain wheel and the sill is made longer than usual to enable it to reach the pivot N, which is above the pivot M and fitted in a bracket N$^2$ nearer the side of the threshing apparatus. The grain wheel being sufficiently high, this arrangement affords plenty of vertical room or space wherein to move the sickle up and down to accommodate it to different heights of grain, which it can cut near the heads or close to the roots or at any point intermediate. The arrangement also has the effect of maintaining the spout in correct position relatively to the feeder-house, as will be explained farther on. The sickle or cutter frame, as is customary, is secured to the rear of the A-frame by arms Q$^2$ separately connected therewith by eye-bolts Q$^3$, or equivalent link-connections, and with or without interposed brackets, as Q$^4$ (Fig. 4). Forwardly, the cutter frame is held up by the levers R and R$^2$ with the aid of intervening chains or similarly suitable connections. The drawings show chains, namely, the beforementioned adjusting chain O and an additional chain U. The levers are fulcrumed on the top of the A-frame as usual, and so is the chain U fastened to the back bar of the cutter frame and to the forward end of the lever R$^2$ thereabove in the usual manner. As to the chain O, it is attached at one end to a hook Q$^5$ on the said back bar of the cutter frame, thence is run up over a vertically disposed pulley V hung from the forward end of the lever or balancing beam R, thence rearward along the under side of the said forward end of the balancing beam around a horizontally disposed pulley V$^2$ supported from the beam adjacent to the fulcrum or hinge thereof, thence inwardly above the inner end of the forward sill of the frame P (the A-frame), thence over another vertically disposed pulley V$^3$ bracketed on the inside of the said forward sill of the A-frame a short distance from the pivot N, and down to the inner end of the forward cross timber B of the thresher frame to which the other end of the said chain O is secured in any convenient manner, as with an eye or staple V$^4$. It will be seen that, being located at a distance from the pivot N, the pulley V$^3$ is carried in the arc of a circle as the forward sill of the A-frame is swung upon the said pivot, and when this takes place the pulley is caused to vary its distance from the staple V$^4$, being closer to it as the outer end of the A-frame is moved down, and farther away from it when the A-frame is moved up. Now, as the pulley V$^3$ and the rest of the supports and attachments are fixed relatively to each other, it is evident that the variation of the distance between the said pulley V$^3$ and the staple V$^4$ will cause a slackness in the chain O which will let the inner end of the cutter-bar move down faster than the outer end when the A-frame is lowered, but will draw upon the said chain O and raise the inner end of the cutter-bar faster than the outer end when the A-frame is elevated. This will keep the inner end of the cutter-bar from dragging upon the ground when the machine is inclined as shown in Fig. 3, and it will also let it approach to the proper distance above the ground when the machine is standing on a level or on an incline in the opposite direction. It will further be observed that the location of the pulley V$^2$ by the hinge or fulcrum of the balancing beam or lever R allows the chain O to be taken up or let out as the machine is tipped to one side or the other, without interfering with the balancing beam. The permanent vertical adjustment of the cutter-bar is effected by varying the length of the chains in any desired manner.

As before stated, the spout S is hinged or flexibly secured to the inner end of the cutter frame and it enters the feeder-house T, into which it delivers the cut grain. Naturally there is longitudinal movement of the spout relatively to the feeder-house when the header is inclined in either direction, and it is necessary to control or counteract this movement in order to prevent the delivery end of the spout from being drawn out when the header is lowered or being forced in too far when the header is raised. I therefore locate the forward pivot N of the A-frame above the other pivot M and nearer the side of the thresher as previously noted, so that the forward sill of the A-frame will be pivoted on the side of the thresher on a line with the bottom of the opening of the feeder-house which the spout enters. This, we have seen, necessitates making the forward sill of the A-frame longer than the rear one, which causes its outer end to move in a different circle and operates to move the outer end of the cutter frame backward or forward as the A-frame is inclined above or below the level. The spout being connected to the cutter frame it is necessarily drawn in one direction or the other coincidently with these movements, and as the outer end of the header is forced back when raised and forward when lowered and the thresher is correspondingly tipped, the spout will remain substantially stationary with relation to the feeder-house whether the machine is moving over level or inclined ground. This adjustment of the spout is entirely automatic, as is also the before described adjustment of the inner end of the cutter-bar, both adjustments rendering the machine peculiarly well adapted for use on all surfaces upon which grain may be grown.

What I claim, and desire to secure by Letters Patent of the United States, is:

1. In a harvesting machine, the combination with a main frame, of a crank axle loosely mounted upon the frame, a supporting wheel loose upon the crank axle, means for adjustably rotating the axle, a spindle loosely carried by the frame and loosely piercing one arm of the crank axle, the inner end of the spindle having an eccentric portion, means to adjustably fix the spindle in the arm of the crank axle, a drive gear upon the supporting wheel, a pinion loose upon the eccentric portion of the spindle and in mesh with the drive gear, and a transmission gear fixed to the pinion and being connected through said spindle to the crank.

2. In a harvester and thresher, a double crank upon which the main frame is mounted, one arm of which is perforated transversely, an eccentric spindle adjustably secured in the perforation of said arm, one end of which spindle forms a journal and the other end of which is provided with a pinion, a driving-wheel journaled on the double bent portion of the crank, and a gear on the periphery of said wheel in engagement with said pinion.
3. In a harvester and thresher, a double crank upon which the main frame is mounted, one arm of which is perforated transversely and provided with a set-screw, a spindle adjustably secured in the perforation of said arm, the spindle comprising a plurality of connected offset members one of the members of the spindle being provided with a pinion and the other member constituting a support for the crank, a driving-wheel journaled on the double bent portion of the crank, and a peripheral gear on said wheel engaging said pinion.

4. In a harvester, two driving-wheels, crank-axles therefor and mechanism for simultaneously moving them vertically in opposite directions, one member of said mechanism comprising a shaft and two sprocket-wheels loosely mounted thereon, each sprocket-wheel being provided with a clutch member, a non-rotatable double clutch slidably mounted on said shaft between the sprocket-wheels, a second shaft mounted adjacent to the sprocket-wheels and also provided with two sprocket-wheels rigidly secured thereon and in the same plane with the first named sprocket-wheels respectively, a sprocket chain from the threshing mechanism passing over two of said sprocket-wheels to rotate them in opposite directions, and a sprocket chain over the other two sprocket-wheels to drive them in the same direction.

5. In a harvester, an adjustable thresher, a header flexibly connected therewith, the header provided with a cutter bar, and means for automatically adjusting the inner end of the cutter-bar vertically independently of the outer end.

6. In a harvester, an adjustable thresher, a header flexibly connected therewith, a cutter bar carried by the header, a suitably supported chain connected with the thresher at one end and with the inner end of the cutter-bar at the other, and means for automatically varying the position of the support for the chain whereby the inner end of the cutter-bar is adjusted vertically independently of the outer end of the cutter bar.

7. In a harvester, an adjustable thresher, a header frame flexibly connected therewith, a cutter bar mounted in the header frame, the frame carrying a counterbalance for the cutter-bar, pulleys on the counterbalance, a pulley on the header frame, and a chain over said pulleys, one end of which is connected with the cutter-bar and the other end with the thresher.

8. In a harvester, an adjustable thresher, a header frame flexibly connected therewith at two points, one in advance of and above the other and nearer the thresher, a support and a cutter-bar suspended therefrom at its outer end, two pulleys on the support and one pulley on the header frame at a distance from the forward pivot, and a chain over said pulleys, one end of which is secured to the inner end of the cutter-bar and the other end to the thresher.

9. In a harvester, the combination with a frame, and adjustable traction wheels connected therewith, of means for adjusting the traction wheels comprising, gear mechanisms for actuating the wheels relative to the frame, a worm shaft for actuating the gear mechanisms, sprockets loosely supported on the shaft, clutch means for connecting either of the sprockets to the shaft, a second shaft, adjacent the worm shaft, sprockets keyed on said second shaft, a suitable drive shaft provided with a sprocket, a flexible connection extending around the sprocket on the drive shaft beneath and in engagement with one of the sprockets on the second shaft and around one of the sprockets on the worm shaft, and a second flexible connection connecting the remaining sprockets on the worm and second shafts respectively.

10. In a harvester, the combination with a frame and adjustable traction wheels connected therewith, of means for adjusting the traction wheels comprising gear mechanisms for actuating the wheels relative to the frame, a worm shaft for actuating the gear mechanisms, sprockets loosely supported on the shaft, clutch means for connecting either of the sprockets to the shaft, a second shaft adjacent the worm shaft, sprockets keyed on said second shaft, a suitable drive shaft provided with a sprocket, a flexible connection extending around the sprocket on the drive shaft, an idle sprocket over which the flexible connection passes, thence beneath and in engagement with one of the sprockets on the second shaft and around one of the sprockets on the worm shaft, and a second flexible connection connecting the remaining sprockets on the worm and second shafts.

11. The combination with a main frame and a header frame pivotally connected therewith, of a cutter bar frame pivotally supported intermediate its ends upon the header frame, counterbalance levers pivoted on the header frame, and flexible connections extending between the counterbalance levers and the cutter bar frame.

12. The combination with a main frame and a header frame pivotally connected therewith, of a cutter bar frame pivotally supported upon the header frame, counterbalance levers pivoted on the header frame and flexible connections extending between the counterbalance levers and the cutter bar frame, one of the flexible connections being automatically adjustable.

13. The combination with a main frame and a header frame pivotally connected therewith, of a cutter bar frame pivotally secured to the header frame, counterbalancing means pivotally supported on the header frame, a flexible non-adjustable connection extending between the cutter bar frame and the counterbalancing means, and an adjustable connection extending between the cutter bar frame and the counterbalancing means.

14. The combination with a main frame and a header frame pivotally secured thereto, of a cutter bar frame pivotally suspended from the header frame, and an adjustable connection having one end secured to the cutter bar frame and the opposite end secured to the main frame, and antifriction means for supporting the adjustable connection intermediate its ends.

15. The combination with a main frame and a header frame pivotally secured thereto, of a cutter bar frame, a plurality of arms attached to the cutter-bar frame and linked to the header frame, counterbalancing means mounted upon the header frame, and flexible connections extending between the counterbalancing means and the cutter bar frame.

In testimony whereof I have signed my name to this specification in the presence of two subscribing witnesses.

GEORGE W. INGERSOLL. [L. S.]

Witnesses:
A. H. STE. MARIE,
HENRY B. LISTER.